United States Patent
Oswald et al.

(10) Patent No.: US 6,215,438 B1
(45) Date of Patent: Apr. 10, 2001

(54) VEHICLE RADAR SYSTEM

(75) Inventors: Gordon Kenneth Andrew Oswald, Huntingdon; Nicholas John Kerry, Burwell; Eric Nicol Clouston, Chesterton; Graeme Peter Smith, Bishops Stortford, all of (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/214,247
(22) PCT Filed: Jun. 30, 1997
(86) PCT No.: PCT/GB97/01765
  § 371 Date: Sep. 17, 1999
  § 102(e) Date: Sep. 17, 1999
(87) PCT Pub. No.: WO98/00729
  PCT Pub. Date: Jan. 8, 1998

(30) Foreign Application Priority Data

Jun. 28, 1996 (GB) .................................................. 9613645

(51) Int. Cl.$^7$ .................................................... G01S 13/93
(52) U.S. Cl. ................................ 342/70; 342/27; 342/28; 342/71; 342/104; 342/118; 342/147
(58) Field of Search .................................... 342/27, 28, 29, 342/41, 61, 70, 71, 72, 175, 195, 104–118, 134, 135, 136, 147

(56) References Cited

U.S. PATENT DOCUMENTS 3,660,846 * 5/1972 Anderson ................................ 342/41
3,768,097 * 10/1973 Ziegler .................................. 342/136
3,898,653 * 8/1975 Ban et al. ............................. 342/109
4,165,511 * 8/1979 Wocher et al. ......................... 342/70

* cited by examiner

Primary Examiner—Bernarr E. Gregory
(74) Attorney, Agent, or Firm—Lee, Mann, Smith, McWilliams, Sweeney & Ohlson

(57) ABSTRACT

A radar system adapted to be installed on a vehicle (1) is operable to detect objects in different fields of view of the system. The system has transceiver means (2, 3; 44, 46) for transmitting a radar signal and receiving the signal after the latter has been reflected from an object to be detected. A reflected signal is sampled by sampling means (12; 66) during a succession of sampling periods each of which is delayed with respect to a corresponding portion of the transmitted signal. The gating of the reflected signal effectively generates range shells, each of which corresponds to the time taken for a transmitted signal to reach an object at the shell, and to be reflected back to the system and is hence related to the delay between the transmission of the signal and the corresponding sampling period. The range shells define the field of view of the system, which can be changed by altering said delay. Such alterations are carried out under the control of control means which is connected to sensor means for detecting a property of the operation of the vehicle, determining a required position of the field of view, and setting the field of view of the system accordingly. The range shell positions, and hence fields of view, can also be changed by selecting alternative transmitters and/or receivers of the transceiver means. There is also shown a motor road vehicle which has a radar system comprising a pair of transmitter antennas at two alternate corner regions of the vehicle and a pair of cooperating receiver antennas of the other two corner regions. Certain embodiments of the system also have the facility to generate range shells which are swept over an area around the vehicle or which track detected objects.

26 Claims, 6 Drawing Sheets

FIELD OF VIEW FOR REAR OBSTACLES

BLOCK DIAGRAM OF BASIC RADAR SYSTEM

FIELDS OF VIEW FOR REAR AND SIDE OBSTACLES

RECEIVING ANTENNAS DISPLACED HORIZONTALLY AND VERTICALLY GENERATE THREE RANGES TO AN OBSTACLE

VEHICLE RADAR SYSTEM

FIELD OF THE INVENTION

This invention relates to a radar system adapted to be installed on a machine or vehicle, particularly a motor road vehicle, and to such a vehicle fitted with a radar system.

BACKGROUND TO THE INVENTION

It has been proposed to install radar systems in motor road vehicles and on other machinery for detecting objects of various kinds. Such systems generally use co-located and closely coupled transmitters and receivers which are arranged to detect the presence or approach of objects in a particular direction or situation, for example, when a vehicle is reversing.

However, known systems have tended to be expensive and tend only to be useful in a narrowly specified set of situations.

THE INVENTION

According to the first aspect of the invention, there is provided a radar system adapted to be installed on a vehicle (preferably a motor road vehicle) and operable to detect objects in differing fields of view of the system, the system comprising transmitter means for transmitting a radar signal; receiver means for receiving the signal after the latter has been reflected from the reflecting surface of an object to be detected; gating means for sampling the reflected signal received by the receiving means during a succession of sampling periods, each of which is delayed with respect to a respective portion of the transmitted signal by a time delay corresponding to the time taken for that portion to travel to the reflecting surface when the latter is at a notional range shell, and then back to the receiving means, so that a reflected signal received during that period is indicative of the presence of a reflecting surface at the range shell; control means for controlling the field of view of the system and sensor means which is connected to the control means and is operable to detect one or more features of the operation of the vehicle, which features are characteristic of the required field of view of the system wherein the control means in use determines said required field of view and sets the field of view of the system accordingly, in dependence on the output of the sensor means.

A single antenna may comprise both the transmitter means and the receiver means, but preferably the transmitter means and receiver means comprise a plurality of antennas.

The field of view of the system corresponds to the position(s) of the range shell relative to the vehicle, and hence defines the possible positions of any object which can be detected by the system.

Thus, if the system has only one transmitter and one receiver arranged only to detect objects in one sector relative to the vehicle (for example behind the vehicle), the alteration of the field of view is achieved simply by altering the distance of the range shell from the vehicle. If, however, the system has a plurality of suitably positioned transmitters or receivers, the angular position of a current range shell relative to the vehicle will depend on which transmitter and receiver are being used, and can be correspondingly altered by using another receiver or transmitter, thus also altering the field of view of the system.

Accordingly, depending on the configuration of the transmitter and receiver means, said control of the field of view of the system is achieved by controlling either the distance (i.e. range) of each range shell or by selection of the antenna (or pairs of antennas) and associated antenna beams to be used, thereby controlling angular position of the range shell or by controlling both distance and angular position of the range shell.

Preferably, the radar system comprises a pulsed radar system, in which the transmitted signal comprises a succession of pulses, each of which constitutes a respective one of said portions of the transmitted signal.

Preferably, the control means is operable to detect fluctuations in the signal received in a succession of sampling periods, said fluctuations corresponding to an object entering or leaving a range shell. Alternatively, the control means may be operable to detect any DC offset of signal received over a succession of sampling periods with respect to a reference level to determine whether there is an object at the range shell which object is stationary relative to the range shell.

In the former case, the control means is preferably operable also to analyse the received signals to determine the principal frequency thereof, or the time delay between detections at different range shells, and hence to estimate the velocity of the object relative to the range shells.

Preferably, the transmitter and receiver means are adapted to be mounted on the vehicle in positions which are such that, in use, the system can detect a presence of objects at any position around the vehicle.

To that end, the transmitter means and receiver means are preferably mountable in the regions of the corners of the vehicle, and are conveniently adapted to be incorporated into the vehicle bumpers.

In such a case the system can detect objects in front of, to the sides of and behind the vehicle.

This can be achieved by transmitter means comprising two antennas adapted to be mounted at diagonally opposite corner regions of the vehicle, and receiver means comprising two antennas adapted to be mounted at the other corner regions of the vehicle.

Thus, the rear transmitter antenna is used to provide signals which are reflected from objects behind the vehicle and received by the receiver antenna at the other rear corner, and also provides signals which are used to detect objects to its own side of the vehicle and are received at the receiver antenna on the front corner on the same side. Similarly, the forward transmitter antenna can provide the signals which are used to detect objects in front of and to the other side of the vehicle. This feature therefore enables a relatively large area of coverage to be achieved using fewer transmitter/receiver antennas than would be the case if the system used co-located transmitter and receiver antennas.

The sensor means may include sensors responsive to the operation of the direction indicators or to steering wheel movement of the vehicle, or to the operation of the vehicle brakes.

In the latter case, the control means may be so arranged that, when the vehicle brakes are operating, the range shells are positioned relatively close to the vehicle. The sensors responsive to the operation of the direction indicators or to steering wheel movement can cause a selection of range shells to the side of the vehicle on which the indicators are operating or towards which the wheel is turned, as the case may be.

The sensor means may additional or alternatively determine the speed of the vehicle, the distance of the range gates from the vehicle increasing if the detected speed of the vehicle increases.

The sensor means may include a sensor for determining whether reverse gear has been selected on the vehicle, in response to which the control means is operable to activate the rear antennas of the vehicle.

Additionally or alternatively, the sensor means may to advantage be operable to determine the speed with which the vehicle is reversing.

In such a case, the control means is preferably operable to set the range shell, when the vehicle is reversing, at a distance which increases with increasing speed, in accordance with a predetermined relationship.

Preferably, that relationship is such that the range shell distance is directly proportional to the speed of reversing, subject to a minimum range shell distance when the vehicle is stationary or slow moving.

Additionally or alternatively, the control means progressively increases or decreases said time delay for successive periods so that the distances of successive range shells increases or decreases between said predetermined minimum distance and the maximum distance determined in accordance with said relationship, so that the range shells sweep the area between said minimum and maximum scan distances. Such a succession of range shells will be referred to as a scanning range shell.

The rate at which said time delay is increased or decreased may be in proportion to the vehicle speed and/or related to vehicle direction. Furthermore, if the vehicle is moving forwards, the delays in the sampling of the output of the forward antenna may progressively decrease, thus causing the scanning shell in front of the vehicle to move inwards towards the vehicle, whilst the delays associated with the rear receiver antenna progressively increase so that the rear shell scans away from the rear of the vehicle. The front and rear shells may scan in opposite directions if the vehicle is reversing.

In either case, the scanning direction of any of the scanning shells preferably is such as to reduce the speed of motion of the shell so as correspondingly to reduce the doppler shifted frequency(ies) of any signal reflected from the shell. This in turn reduces the noise bandwidth of the system.

Such scanning also enables the system to detect objects which, when at the maximum distance are to one side of the area to which the system is sensitive, but which subsequently move, relative to the vehicle, sideways into the path of the vehicle, (for example when the vehicle is reversing around a corner).

According to a second aspect of the invention, there is provided a vehicle fitted with a pulsed radar detection system comprising two transmission antennas operable to transmit a series of pulses, and mounted at diagonally opposed corner regions of the vehicle, and two reception antennas, which are operable to receive pulses reflected from other objects and which are mounted at the other corner regions of the vehicle.

Preferably, on detection of an object at a given shell, the control means is operable to control said time delays so that the corresponding range shells all extend into the vicinity of the object so that the range shells, in effect, track the object.

In this case, the reduction of range shells is then in part governed by the detection of objects at previous shells.

The invention also lies in a vehicle fitted with a radar system with both transmitters and receivers at all (four or more) corners of the vehicle.

The invention also provides a radar system adapted to be installed on a vehicle and operable to detect objects in differing fields of view of the system, the system comprising transmitter and antenna means for transmitting radar signals, receiver and antenna means for receiving such signals; means for detecting the presence or absence of a reflecting target at a pre-determined set of ellipsoidal range shells around the vehicle; selector means for selecting the field of view of the system and sensor means connected to the selector means and operable to detect one or more features of the state of operation of the vehicle, which features determine the required field of view.

BRIEF DESCRIPTION OF THE DRAWINGS

The invention will now be described, by way of example only, with reference to the accompanying drawings in which.

DETAILED DESCRIPTION

Figure 1:
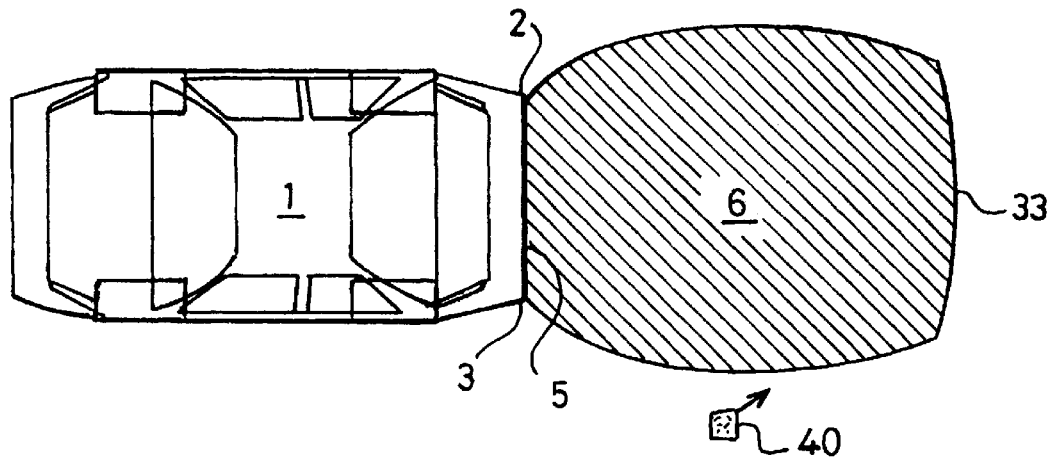
FIG. 1 is a plan diagrammatic view of a motor car fitted with a radar system in accordance with the invention, the system being arranged to detect objects to the rear of the car.

With reference to FIG. 1, a motor car 1 is fitted with a radar system comprising a transmit antenna 2 and a receive antenna 3. Both antennas are of the flat conformal type, and are mounted in the rear bumper 5 of the car. The transmit and receive antennas are respectively positioned at the regions of the rear nearside and rear offside corners of the car.

In use, the antenna 2 transmits a series of short radio frequency pulses, each of which is typically of 0.1 to 5 nanoseconds' duration depending upon the rise and fall times and the frequency response characteristics of the antenna 2. In general, each pulse consists of only a few cycles of the dominant radio frequency. However, the pulses are to be distinguished from those used by the class of "ultra-wideband radars", in which a transient waveform contains a very wide spectrum of frequencies, and is unlikely to meet electromagnetic compatibility requirements. The frequency of occurrence of the pulses is of the order of MHz.

Figure 2:
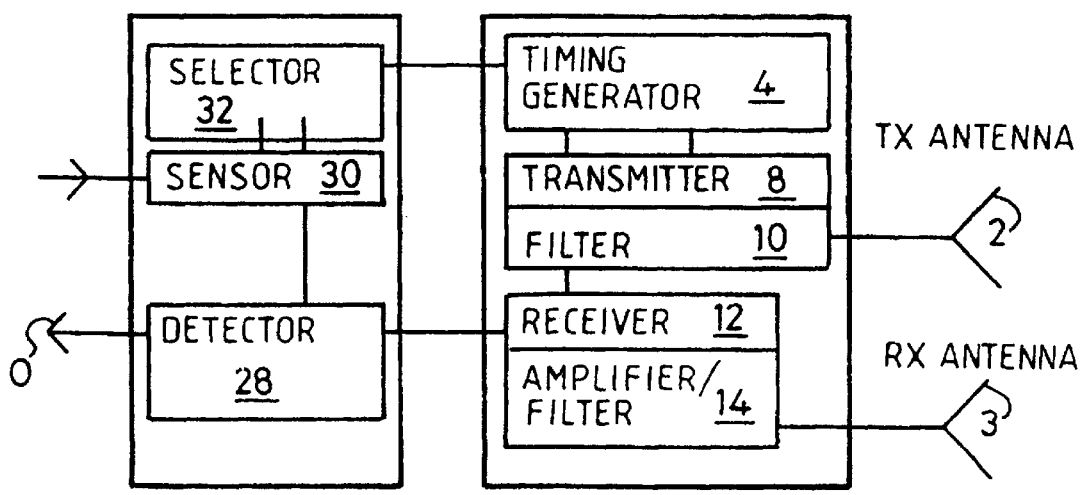
FIG. 2 is a block diagram of the radar system shown in FIG. 1.

With reference to FIG. 2, the transmission of pulses by the antenna 2 is initiated by a timing generator 4 which, by means of a stable oscillator, triggers a transmitter generator 8 of a transmitter 8 to the antenna 2 via band pass frequency filtering means 10.

Before being transmitted by the antenna 2, the pulses generated by the generator filtered in the filtering means 10 to which allows frequencies in an operating band of 5.7–7.2 GHz to pass to the antenna for transmission.

The timing generator 4 is also connected to a gating receiver 12 which is, in turn, connected to the receive antenna 3 via amplifying and filtering means 14, which amplifies and filters the signals received by the antenna 3, to pass the same band of frequencies as are passed by the filter 10.

The gating receiver 12, in response to a signal from the timing generator 4, samples the signals received by the antenna 3 after those signals have been filtered and amplified.

The output from the gating receiver 12 is connected to a detector circuit 28 which determines the presence or absence of an obstacle depending upon whether a reflected signal has been received by the antenna 3, and generates an output 0 representative of the presence or absence of such a reflection. The operation of the detector 28, timing generator 4 (and hence the transmitter 8 and the receiver 12) is controlled by means of a selector 32 which receives signals from a sensor 30 which provides signals indicating the state of control/operation of the vehicle. In the illustrated embodiment, the sensor 30 is a speed sensor which detects the speed at which the vehicle 1 is reversing. The selector 32 controls the delay between the generation of each transmitted pulse and the respective gating of the output from the amplifier/filter 14 in accordance with the relationship discussed below.

In general, the timing generator 4, acting under the control of the selector 32, causes the gating receiver 12 to sample the output of the receive antenna 3 for a predetermined period (a sampling period of, for example, 0.05–2.5 nanoseconds) at one or more predetermined delays (normally of 1 to 200 nanoseconds corresponding to ranges of 15 cm to 30 m behind the vehicle) after the transmission of a given pulse by the antenna 2. If the antenna 3 receives the reflection of such a pulse during a given sampling period, this is indicative of the transmit pulse having travelled from the antenna 2 to a reflecting surface and back to the antenna 3 in the delay between the transmission of the pulse and the respective sampling period.

From this information, it can be deduced that the reflecting surface lies somewhere on a range shell (hereinafter referred to as a range gate), for example the range gate 33 in FIG. 1, the distance of which from the car 1 is such that the time taken for a pulse to travel to the range gate and back to the car 1 is the same as the delay between the transmission of the pulse and that sampling period.

Thus, the range gate can be considered to be in the form of a part ellipsoidal shell having antennas 2 and 3 at its focii. The range gate does not take the form of a full ellipse enveloping the car 1 because the transmit and receive antennas 2 and 3 do not provide all round coverage. In fact, the lateral extent of the range of the system is determined by multiplying together the beam patterns of the antennas. In FIG. 1, the shaded area 6 is the portion of the area in the range of the system between the gate 33 and the car 1.

Figure 5:
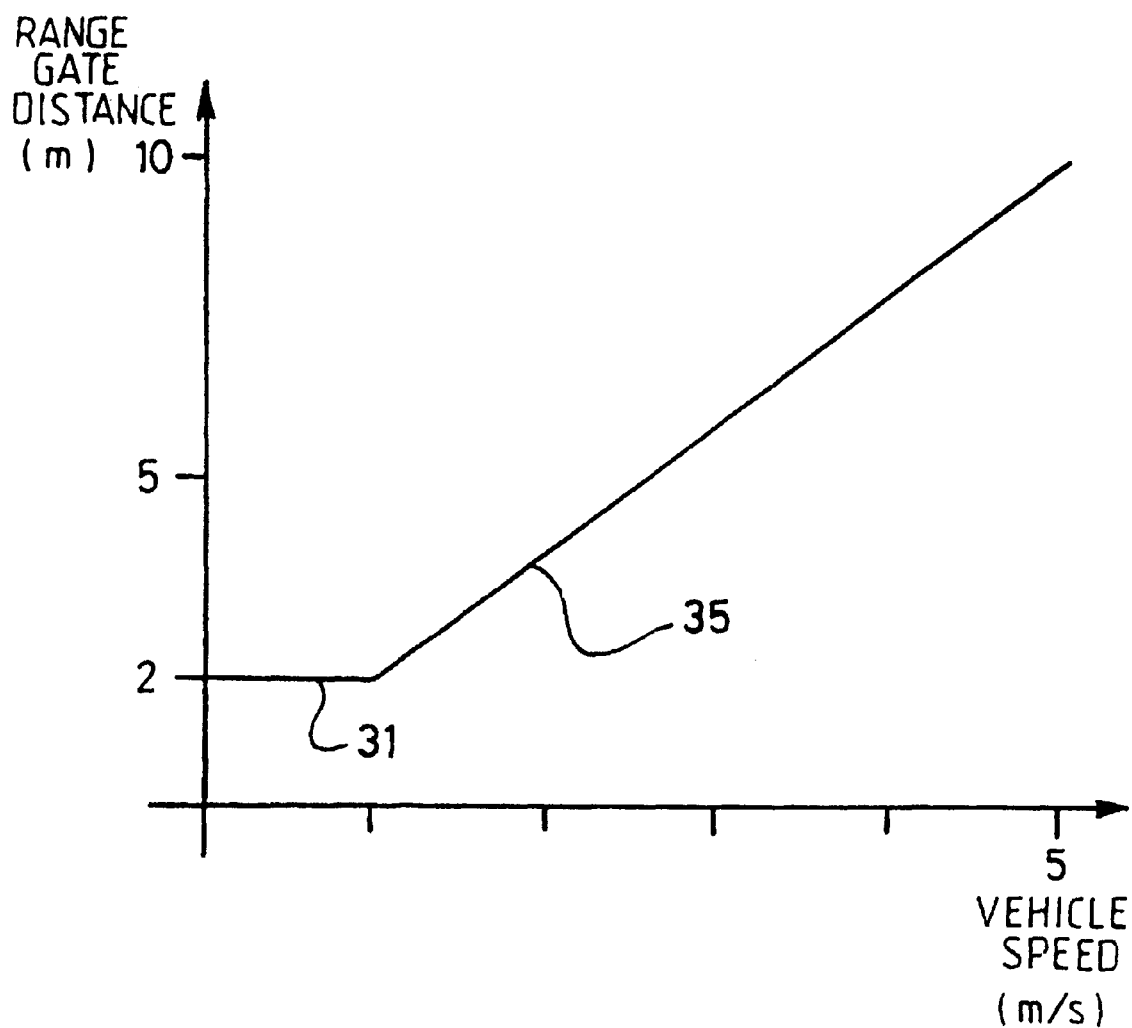
FIG. 5 is a graph showing the relation ship between the distance of one of the range gates shown in FIG. 4 to the speed at which the car is reversing.

The distance of the range gate 33 from the rear of the car 1 is determined by the selector 32 in accordance with the relationship illustrated in FIG. 5. Thus, when the vehicle reversing speed is less than I meter per second, the range gate 33 is set at a predetermined minimum distance of 2 meters from the rear of the car 1 as indicated by the horizontal portion 31 of the graph. However, as reversing speed increases, so the driver of the car needs to be warned of obstacles further away from the rear in order to have time to stop the car if necessary. Therefore, as the reversing speed increases beyond 1 meter per second, the distance of the range gate 33 correspondingly increases, as indicated by the sloped portion 35 of the graph.

Figure 3:
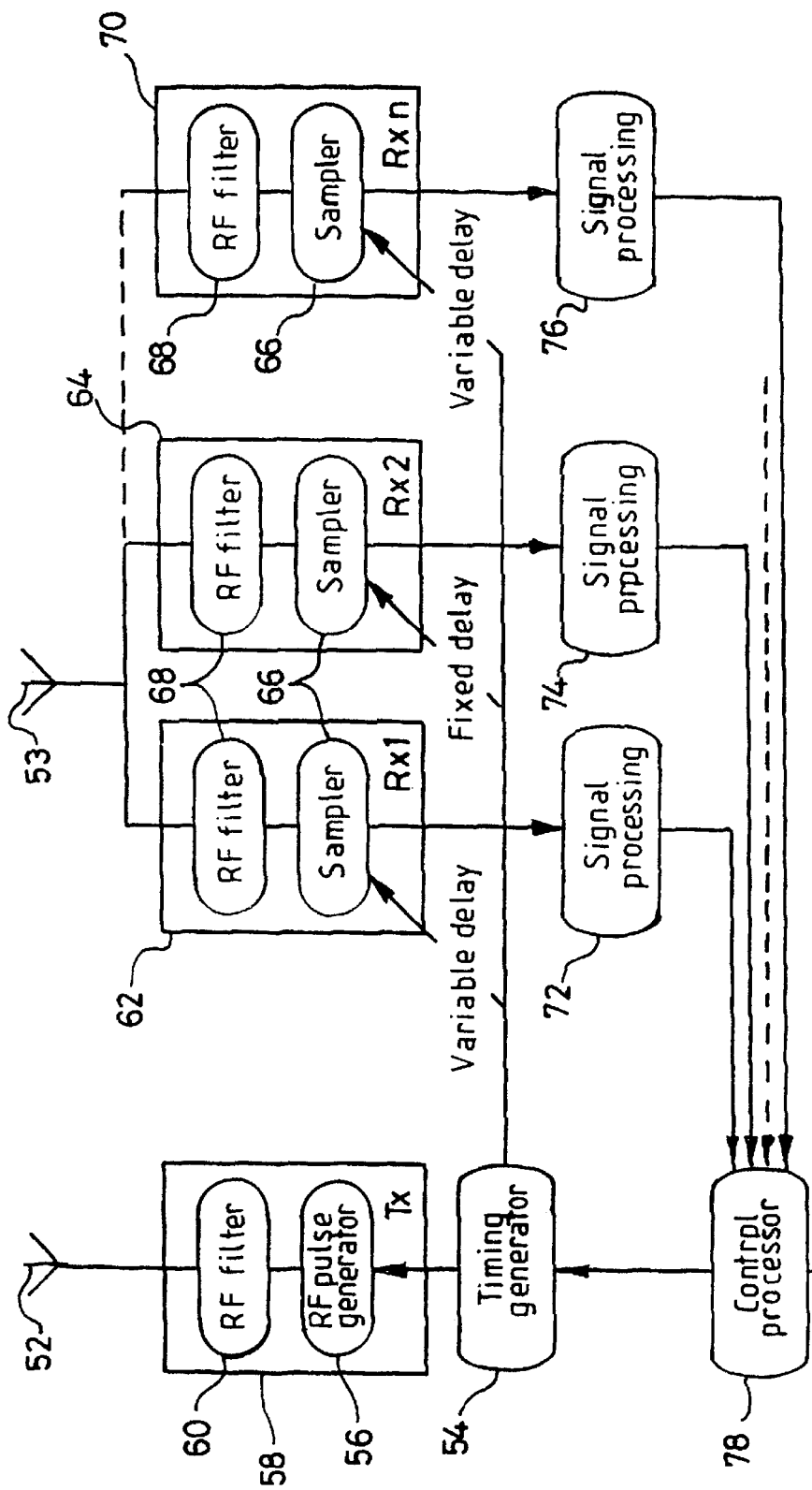
FIG. 3 is a block diagram of a modified version of the system.

The system shown in FIG. 3 is similar in many respects to the system in FIG. 2. However, the system has a number of gating devices, for example 62, 64 and 70 connected to a receive antenna 53 (corresponding to the antenna 3) for receiving reflections of pulses transmitted by a transmitter antenna 52 (corresponding to the antenna 2).

The transmission of pulses by the antenna 52 is initiated by timing generator 54 which, by means of a stable oscillator, triggers a transmit generator 56 of a transmitter 58 connected to the antenna 52. Those pulses are similar to the pulses generated by the transmitter 8 and, before being fed to the antenna 52, are filtered in a band-pass filter 60 to remove frequency components which would interfere with nearby radio equipment in the same or other vehicles.

The timing generator 54 is also connected to the gating devices 62, 64 and 70, each of which includes a respective sampler 66 which samples the output of the antenna 53 in response to a signal from the timing generator 54. RF filters 68 connected between the samplers 66 and the antenna 53 filter any signals received by the latter to remove interference from continuous wave sources, for example radio broadcasts or mobile phone transmissions. The gating devices 62, 64 and 70 all include amplification means (not shown) for amplifying the received signals.

The outputs of the gating devices 62, 64 and 70 are connected to respective signal processing units 72, 74 and 76 which then feed the processed signals to control means in the form of a control processor 78 for analysing signals from the processors to determine whether or not to initiate the operation of a Man Machine Interface 80 which may be a visual or audible alarm.

Each signal processing unit thus incorporates a respective receiver for detecting signals received through the gating devices, the bandwidth of the receiver being variable depending upon the nature of the signal to be analysed. The control processor 78 also sends signals to the timing generator 54 for causing the latter to initiate the transmission of pulses and the sampling of the output from the antenna by the gating devices 62, 64 and 70 at times controlled by the processor 78.

The processor 78 is also connected to a motion sensor (not shown) which measures the speed with which the car 1 is reversing.

In use, the timing generator 54 causes a selected one of the gating devices to sample the output of the receive antenna 53 during a relatively short sampling period, preferably less than the rise time of the edge used to generate the transmit pulse at a predetermined delay (normally of 1 to 200 nanoseconds corresponding to ranges of 15 cm to 30 m), thus creating an associated range shell in a similar fashion to the system of FIGS. 1 and 2.

The control means is adaptable to provide time delays which may be fixed for a given vehicle speed, which may increase or decrease regularly with time (to produce a scanning range gate), which may vary so that the range gate moves to track an obstacle which has been detected by the system, or which may vary in response to the movement of the vehicle itself. The control means may further contain circuits which, while the time delay for the range gate increases or decreases regularly between minimum and maximum values, further sampling is carried out to allow the analysis of signals corresponding to particular fixed or adjustable values of delay.

Figure 4:
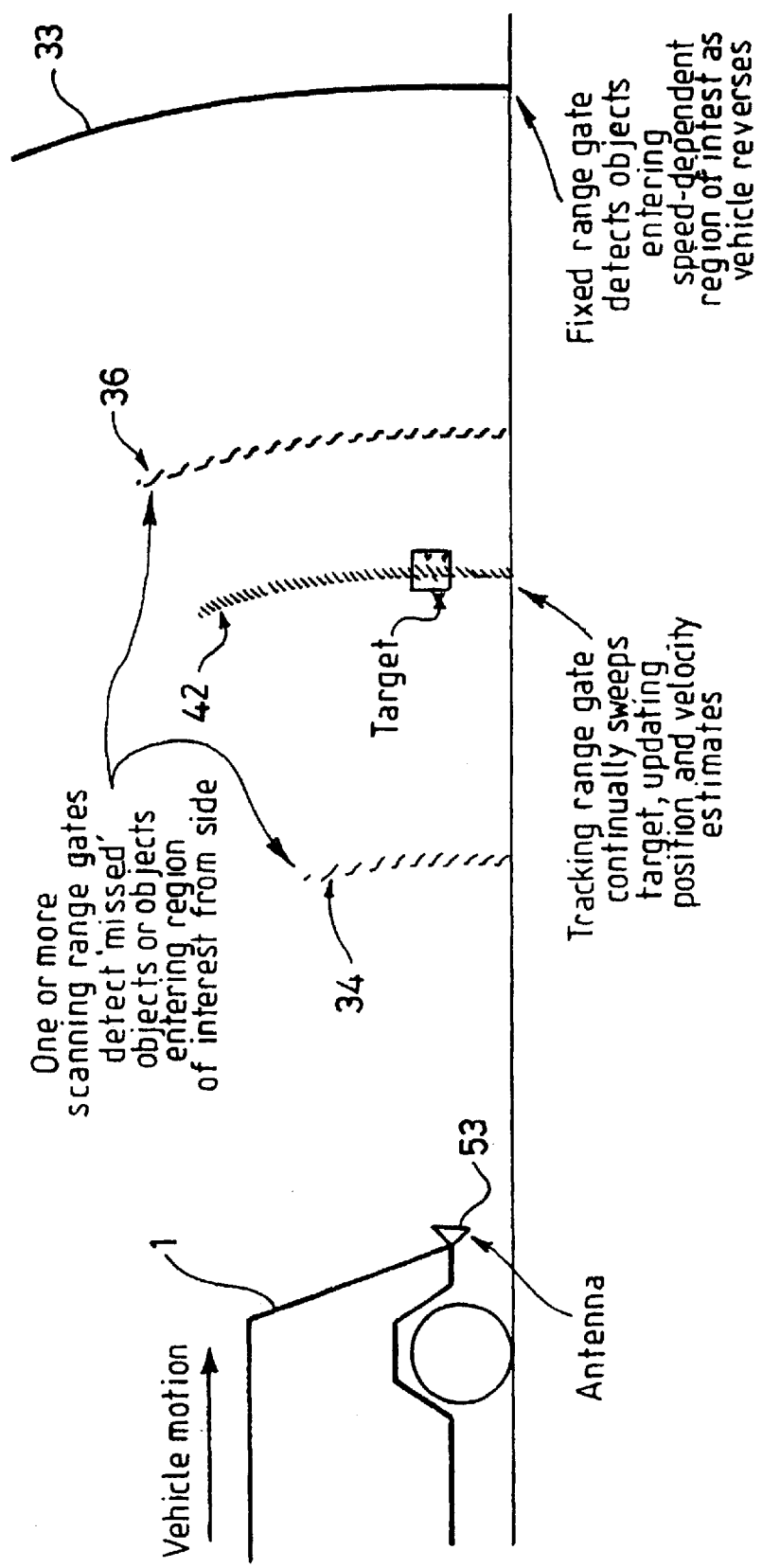
FIG. 4 is a diagrammatic side view of the vehicle shown in FIG. 1, illustrating the operation of the modified version of the radar system, and in particular the range gates generated thereby.

With reference to FIG. 4, each gating device produces a respective range gate. The gating device 64 produces the gate 33 which is at a fixed distance (for at least 1000 operating cycles of the system) from the rear of the car 1, for a given reversing speed. The relationship between the distance of the gate 33 from the rear of the car is the same as that for the gate 33 produced by the system of FIGS. 1 and 2.

The gating device 62 is controlled to sample the output from the antenna 53 at successive sampling periods which occur at successively increasing delays from their respective pulses. For example, if the first sampling period of the device 62 occurs 10 nanoseconds after the transmission of the corresponding pulse, the time delay between the transmission of the next pulse and the next sampling period might be 11 nanoseconds, and this increase in delay can continue until a maximum is reached, whereupon the minimum delay is used once more.

As a result, the gating device 62 produces a range gate which scans an area behind a vehicle. Two possible positions of the scanning range gate are indicated at 34 and 36 in FIG. 4. In this example, the scanning range gate scans from 0.1 meters behind the vehicle to the position of the 'fixed' range gate. Thus, for example, for reversing speeds up to 1 meter per second, the scan range will be 0.1 to 2 meters. The scanning gate sweeps along the shaded zone 6 shown in FIG. 1.

The scanning range gate enables the radar system to detect a moving obstacle such as the obstacle 40 in FIG. 1 which lies outside the lateral range of the gate 33 when at that distance, but which moves into the path of the car after the range gate 33 has passed by. Such an object will not be detected at the range gate 32 produced by the gating device 64, but will be detected at the scanning range gate produced by the gating device 62.

One of the other gating devices can be used to produce a range gate which tracks an object which has been detected behind the car, thus providing an accurate indication of the rate of approach of that object relative to the car. This is achieved by continuously adjusting the sampling delay for the gating device in question under the control of the processor 78. In one example, the tracking range gate (such as the gate 42 in FIG. 4) takes the form of a scanning range gate which sweeps between relatively small limits which are adjusted after each scan based on the output of the sampler.

A possible algorithm for use in determining the limits is one which measures the position of the highest peak in the received signature after each scan and the width of the peak (between adjacent minima or zero crossings, for example). The peak position and its change over a number of scans can be used to obtain an estimate of the target position and velocity, using algorithms such as Kalman filtering. A prediction can then be made of the object position for the next scan and the scan limits set on either side of that predicted position. The scan limits are also set to take into account the possibility of prediction errors and the width of the peak to ensure that the same peak is found in the next scan.

Forward movement of the car is detected by the sensor connected to the control processor 78. In that event, the processor 78 sets a fixed rear gate 33 at a distance which is greater than the distance as indicated by the graph in FIG. 5, and which is independent of vehicle speed. The range gate is then used to detect vehicles approaching the car from the rear, so that the system can, if necessary, warn the driver of the car 1 not to change lanes or overtake other vehicles.

The processor 78 can analyse the received reflected signals to obtain an indication of the velocity of the other vehicle relative to the range gate 33 using the relationship $$\upsilon = 2v/\lambda \, \text{Hz}$$

Where $\upsilon$ is the dominant frequency of the received signal, $v$ is the velocity of the other vehicle normal to the range gate and $\lambda$ is the dominant wave length of the radiated pulses.

In addition, the system can detect the presence of a static object at a fixed position, relative to the car 1, using a corresponding fixed range gate. To do this, the system measures the change in the level of the received signal and the receiver compared to the background level measured in the absence of an object. This requires good long term stability of the receiver circuitry and that the receiver output be DC-coupled. Such an object can also be detected using a scanning range gate since this will provide a corresponding signal to that produced by a moving object passing through a fixed range gate.

If the radar is using pulses of 1 nanosecond duration, and an object is moving relative to a range gate with a speed of 10 meters per second, the dominant energy in the sampled signal will be at a frequency of approximately 67 Hz. In practice, the receiver band width for the system might be set from DC to 200 Hz or more in order that objects moving at a range of speeds of interest might be detected.

In general, scanning or tracking range gates (as described above) are more appropriate for detecting objects fixed relative to the car 1 than are fixed range gates because the objects do not then give rise to a DC signal, and as a result the receiving circuitry of the system needs neither to be DC-coupled nor to have good long term stability. Furthermore, the receiver circuitry does not need to have as large a bandwidth as the circuitry required to detect DC offset, particularly if tracking range gates are used (since their sweep velocity is relatively low). The reduced bandwidth can be used to reject noise both in the receiving circuitry and from external sources, thus improving the signal to noise ratio (particularly if tracking range gates are used, as these lower the doppler bandwidth of the received signal) of the system, compared with fixed range gates.

It will be appreciated that the nature of the range gate generated by each gating device is governed by the control processor 78. Thus, each gating device can produce fixed, scanning or tracking range gates, depending on the signal fed thereto by the control processor 78.

A further discussion of the possible uses of range gates and subsequent analysis is set out below:

The presence of an object at a fixed position (relative to the car 1) can also be detected by using a range gate sweeping between delays either side of that corresponding to the fixed position of interest. The received signal is determined by the normal velocity of the object relative to the range gate, so that the centre-frequency of the receiver can be chosen using the above analysis where $v$ is now the sweep-speed of the range gate. The receiver circuitry bandwidth will usually be chosen to be comparable to the centre frequency, corresponding to the wide-band nature of the transmitted radar pulse.

Using this method, stationary objects do not give rise to a DC signal, so that the receiver needs neither to be DC coupled nor to have good long-term stability.

Note that there are advantages in constraining the bandwidth of the receiver circuitry as much as possible consistent with the received signal in order to achieve rejection of noise, both due to thermal noise in the receiver circuitry and from external sources.

The presence of moving object can also be detected with a swept range gate: the receiver bandwidth m ay need to be increased to allow for higher (or lower) relative normal velocities of objects.

The range of an object can be measured by detecting its position at one of a plurality of range gates (fixed or swept) formed by sampling at different delays after the instant of transmission.

Static range gates could be formed at short spacings, preferably less than one-quarter of the wave length of the transmitted pulse. For example, to cover a region of interest extending to an upper range of approximately 10 m with a transmitted wavelength of 0.3 m might be achieved using 134 separate fixed range gates 0 m, 0.075 m, 0.15 m etc.

Swept range gates could also be formed at short spacings, either with overlapping or non-overlapping sweeps, preferably not less than the wavelength of the transmitted pulse. For example, to cover a region of interest extending to an upper range of approximately 10 m with a transmitted wavelength of 0.3 m might be achieved using 33 separate swept range gates spanning the ranges 0–0.3 m, 0.3–0.6 m, 0.6–0.9 m, etc, or using the same number of separate swept range gates spanning the range 0–0.6 m, 0.3–0.9 m, 0.6–1.2 m, etc.

Using this method the range of an object can be determined from the range corresponding to the range gate on which it is detected. In practice, the extended signature of the object means that it is likely to be detected at several range gates, in which case the median range of those gates can be used.

The range of an object can be determined with higher resolution by using a smaller number of range gates which individually span a greater region of interest, preferably more than four times the wavelength of the transmitted pulse. As the range gate sweeps, the highest peak in the received signal (or some other identifiable feature) can be located. The range of the object is determined from the sampler delay for the sample at which the peak occurs.

More sophisticated signal processing techniques can be used to further increase the range resolution.

For the range measurement of known objects, improved accuracy can be obtained by comparing the received signal with calibrated measured signatures, relating the position of the physical object to specific characteristics of its radar signature.

The motion of an object can be determined by measuring its change in position or range over time, using techniques described above.

Signal processing techniques can be used to improve the resolution or accuracy with which the motion of an object is determined, compared with differential position measurement which is inherently noisy.

The fixed and swept range gates discussed above have been generated using "open-loop" setting of the sampler delay and hence range gate range: on the other hand, the sampler delay for the tracking range gates is dependent on the reflected signals received, and is thus adapted to the motion of the objects detected.

For example, the motion of an object can be determined by tracking it in range with a swept range gate: the gate is repeatedly swept through ranges within which the object lies. At each sweep, the position and velocity of the object is updated and the sweep range adjusted.

In a preferred embodiment, several configurable range gates will be provided. One or more static range gates will be used in a "surveillance" mode for initial detection, following which a range gate and its associated sample can be assigned to tracking the motion of each object within the region of interest.

Figure 6:
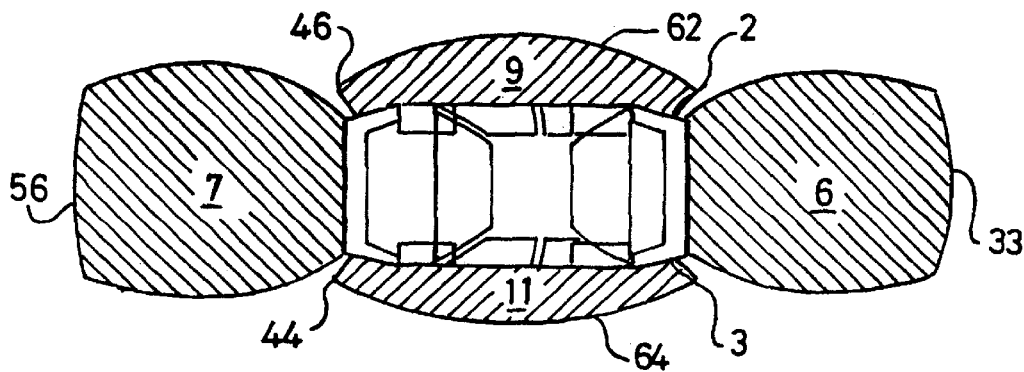
FIG. 6 is a diagrammatic plan view of a car fitted with a further modified version of the system, and illustrates some of the range shells which can be generated by the system, the system being capable of detecting objects in front of, behind or to the sides of the vehicle.

The system shown in FIG. 6 includes the features of the system of FIGS. 1 and 2 (indicated by like reference numerals), and a further transmitter 44 and receiver 46 mounted in opposite end regions of the front bumper of the car. A car fitted with the modified system thus has an antenna in each of its four corner regions, each antenna having a 270 degree field of view in the horizontal plane. A car fitted with this system thus has a respective antenna in each of its four corner regions. The shaded regions 6, 7, 9 and 11 represent the combined beam patterns of the antenna pairs 2 and 3, 44 and 46, 46 and 2 and 44 and 3 respectively, when limited by the range shells 33, 56, 62 and 64 respectively.

The antennas 44 and 46 are respectively connected to a number of gating/amplifying devices and a pulse transmitter and filter, the kind shown (8, 10) in FIG. 2, and those components are in turn connected to a timing generator similar to the generator 4. The control processor for the system (i.e. the selector 32) controls the operation of both pulse generators and all the gating devices, and selects which antennas and which gating devices are to be used depending on the condition of motion and control of the vehicle.

The antennas 44 and 46 thus can be used to generate range gates, such as the gate 56 in front of the car. In addition, the antenna 3 can receive reflected signals transmitted by the antenna 44, whilst the antenna 46 can receive reflected signals which were transmitted by the receiver 2 so as to provide range gates to either side of the car 1. Thus, with just two transmitters and two receivers, the radar system can detect objects all around a car by virtue of being able to generate range gates at the front, rear and sides of the car. When the car 1 is travelling forwards, the antennas 2 and 3 generate the rear fixed range gate 33 at, for example, thirty meters. The range gate 56 is one of a pair of range gates 56 and 58, which scan the regions respectively in front of and behind the car 1. Similar range gates (not shown) scan the regions to either side of the car 1. If any of the scanning or fixed range gates detects another vehicle on the road, a tracking range gate, for example, 62 or 64, so that the relative speed and position of the other vehicle can be accurately monitored.

Thus, for example, if another vehicle being monitored by a forward range gate suddenly decelerates, the associated increase in relative speed and reduction in distance from the car 1 can trigger an alarm. The selector of the radar system is linked to the steering wheel sensors as a result of which the system can determine if the driver of the car 1 is about to change lanes and can warn the driver if this will result in a collision risk. Thus if, for example, the driver wishes to overtake the vehicle ahead, the system will warn of the presence of the vehicle to the right of the car 1.

Figure 8:
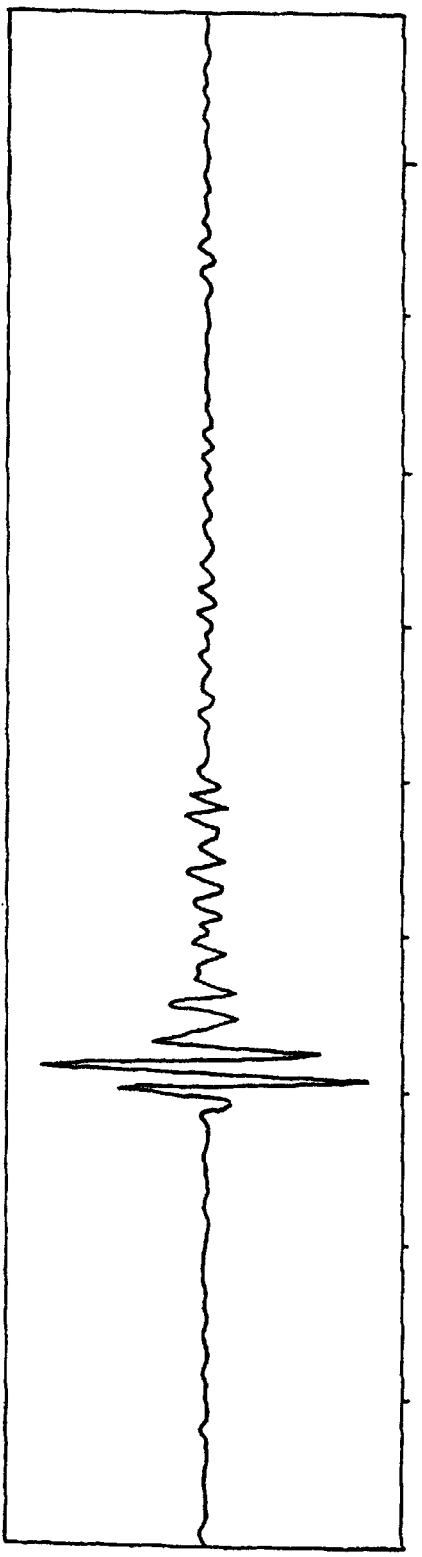
FIGS. 8 and 9 show the "stereo signature" produced by the system on detection of a car.
Figure 9:
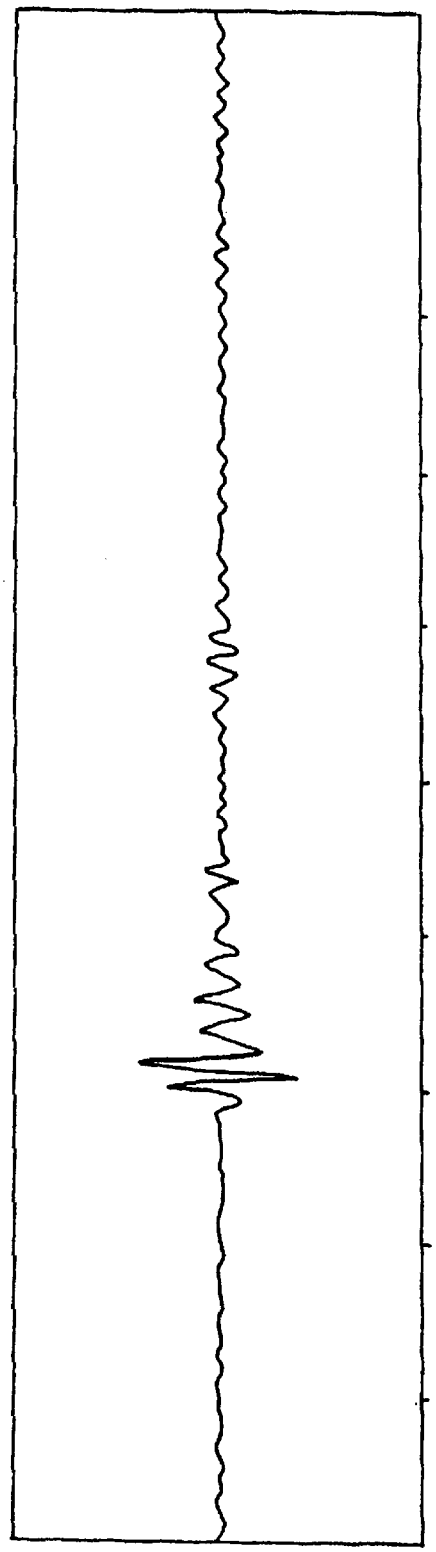

The signals received from the same object at each two horizontally spaced antennas (eg 3 and 46) as a result of reflection of the signal from the same transmitter antenna (eg antenna 2) are shown in FIGS. 8 and 9. In this example, the object is equidistant from the receive antennas leading to simultaneous detection of reflected pulses. In the case of an off-centre object one of the graphs of FIGS. 8 and 9 will be displaced relative to the other along the time axis.

Figure 7:
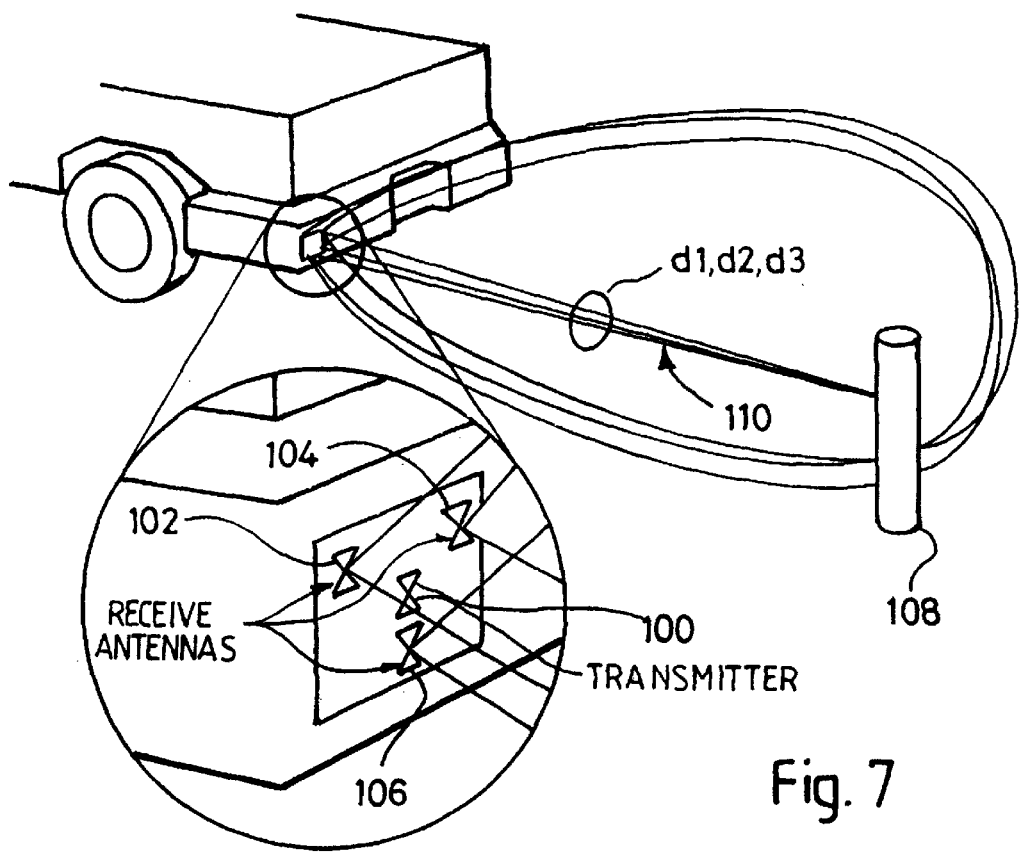
FIG. 7 shows a further modification to a system in accordance with the invention, the modification enabling the system to locate obstacles behind the vehicle.

FIG. 7 shows a further modification to the radar system, in which each corner region of the car includes four antennas, one transmitter antenna and three associated receiver antennas. The Figure shows the front of the car and, in detail, the group of antennas on the front right corner region. As can be seen, that group has one transmitter antenna 100 positioned just beneath two laterally spaced receive antennas 102 and 104, and above a third receive antenna 106 which is vertically and laterally spaced from the antennas 102 and 104. The transmit antenna is connected to a transmitter and filter similar to the transmitter 8 and filter 10, whilst each of the receive antennas, 102, 104 and 106 is connected to a respective gating receiver and amplifier/filter similar to the receiver 12 and amplifier/filter 14, such that each of the receive antennas can be used to generate a respective range gate in conjunction with the transmit antenna 100. The spacial separation of the antennas provides three ranges to the principal reflecting point on an obstacle, for example 108 in front of the car 1, and the system can therefore be used to determine the position of the object by means of triangulation.

The lengths of and angles between notional lines joining the antennas, and notional lines 110 joining the antennas to the obstacle, determine the differences between the lengths (d1, d2 and d3) of the lines 110. Those differences are in effect measured by the radar system using the gating technique previously described.

The signal received from an obstacle depends on the transmitted power (Pt), the reflecting power of the obstacle (pobst), the gain of the transmitting antenna (Gt $(\theta,\phi)$), the gain of the receiver (Gr $(\theta,\phi)$), the range from the receiver to the obstacle (Rro) and from the transmitter to the obstacle (Rto), and the effective area of the receiver (Ae), according to the equation:

$$Pr = \frac{Pt * Gt(\theta, \phi) * (Gr(\theta, \phi) * Robst * Ae}{4 * \pi * Rro^2 * Rto^2}$$

Since the position of the obstacle, Pt, Ae and the gain of each antenna as a function of the polar angles $\theta$ (elevation) and $\phi$ (azimuth) are known, the reflecting power can be calculated directly from the received power, which is measured directly by the radar.

The invention thus provides a radar sensor which can be installed on a machine or vehicle to monitor different volumes of space near the vehicle, in which the special configuration of the radar permits it to perform a number of functions previously regarded as separate, depending on the contents of the nearby space, and on the state of the vehicle.

What is claimed is:

1. A radar system for installation on a vehicle or other mobile machine and for detecting objects in differing fields of view of the system, the system comprising transceiver means for transmitting a radar signal and receiving the signal after the latter has been reflected from the reflecting surface of an object to be detected; sampling means for sampling the output of the transceiver means during a sampling period, which is delayed with respect to a respective portion of the transmitted signal by a time delay corresponding to the time taken for that portion to travel to the reflecting surface when the latter is at a notional range shell, and then back to the receiving means, so that a reflected signal received during that period is indicative of the presence of a reflecting surface at the range shell, a respective field of view of the system being constituted by said range shell so that only reflecting surfaces on the range shell are detected; control means for controlling the position of the field of view of the system and sensor means which is connected to the control means and is operable to detect at least one property of the operation of the vehicle, wherein the control means in use determines a required position of the field of view and sets the field of view of the system accordingly, in dependence on the output of the sensor means.

2. A system according to claim 1, in which the control means controls the field of view by controlling said delay and hence the distance of the range shell from the system.

3. A system according to claim 1, in which the transceiver means comprises at least one of a plurality of transmitter antennas for transmitting said signals and a plurality of receiver antennas for receiving reflected signals, the control means being operable to control the field of view by selecting which of the receiver antennas is to be sampled by at least one of the sampling means and which transmitter antenna is to transmit said signal.

4. A radar system according to claim 3, in which, with the system installed on a vehicle or object, the orientation of each antenna relative to the vehicle or object is fixed.

5. A radar system according to claim 1, in which the radar system comprises an impulse radar system, in which the transmitted signal comprises a succession of pulses, each of which constitutes a respective said portion of the transmitted signal.

6. A radar system according to claim 1, in which the control means, in use, detects fluctuations in the signal received in a succession of sampling periods, said fluctuations corresponding to an object entering or leaving a range shell.

7. A radar system according to claim 6, in which the control means, in use, also analyses the received signals to determine at least one of the principal frequency thereof and the time delay between detections at different range shells, and provides an estimate of the velocity of the object relative to the range shells.

8. A system according to claim 1, in which the control means in use, detects any DC offset of signal received over a succession of sampling periods with respect to a reference level to determine whether there is an object at the range shell which object is stationary relative to the range shell.

9. A radar system according to claim 1, in which the system is for installation on a motor road vehicle.

10. A radar system according to claim 9, in which the transceiver means comprises a plurality of antennas for mounting on a vehicle in such a way that, in use, the system is able to detect the presence of objects at any position around the vehicle, without altering the orientation of any of the antennas relative to the vehicle.

11. A radar system according to claim 10, in which the antennas are configured such that, when an antenna is mounted at a respective corner region of the vehicle, a 270° field of view is provided at that corner.

12. A radar system according to claim 11, in which the antennas are incorporated into the vehicle bumpers.

13. A radar system according to claim 10, in which the transceiver means comprises two transmitter antennas adapted to be mounted at diagonally opposite corner regions of the vehicle, and two receiver antennas.

14. A radar system according to claim 13, in which the sensor means includes sensors for detecting at least one of the operation of the direction indicators and steering wheel movement of the vehicle, wherein the control means selects transmitter and receiver antennas to create range shells to the sides of the vehicle in response to signals from said sensors.

15. A radar system according to claim 9, in which the sensor means is operable to detect the selection of reverse gear on the vehicle, and the control means selects a range shell behind the vehicle in response to said selection.

16. A radar system according to claim 9, in which the sensor means to detects the velocity of the vehicle, the control means selecting range shells at one or more distances from the vehicle related to said velocity.

17. A radar system according to claim 9, in which the sensor means determines whether, and the speed with which the vehicle is travelling.

18. A system according to claim 17, in which the control means, in use, sets the range shell at a distance from the vehicle which increases with increasing speed of the vehicle in accordance with a predetermined relationship.

19. A radar system according to claim 18, in which that relationship is one in which the range shell distance is directly proportional to said speed, subject to a minimum range shell distance when the vehicle is stationary or slow moving.

20. A radar system according to claim 9, in which the transceiver means comprises a plurality of receiver antennas for mounting at different heights on the vehicle.

21. A radar system according to claim 20, in which said antennas are at least one of laterally and vertically spaced from each other.

22. A radar system according to claim 21, in which the control means, in use, locates the position of an obstacle sensed by the system relative to the vehicle and calculates the reflective power of the obstacle using information on antenna sensitivities of the system at that position.

23. A radar system according to claim 1, in which the control means progressively increases or decreases said time delay for successive periods so that the distances of successive range shells progressively increase or decrease, so that the range shells scan a given area.

24. A radar system according to claim 1, in which, upon detection of an obstacle at a given range shell, the control means is select further range shells in the vicinity of said given range shell so that the range shells, in effect, track the obstacle.

25. A surface vehicle fitted with a radar detection system according to claim 1, wherein the system comprises two transmitter antennas operable to transmit a series of pulses, and mounted at diagonally opposed corner regions of the vehicle, and two receiver antennas, which are operable to receive pulses reflected from other objects and which are mounted at the other corner regions of the vehicle.

26. A system according to claim 1, in which the system, in use, generates multiple range shells at different targets.

* * * * *